Nov. 16, 1943.  G. L. McKEE  2,334,637
BAND TIGHTENING DEVICE
Filed Aug. 7, 1942
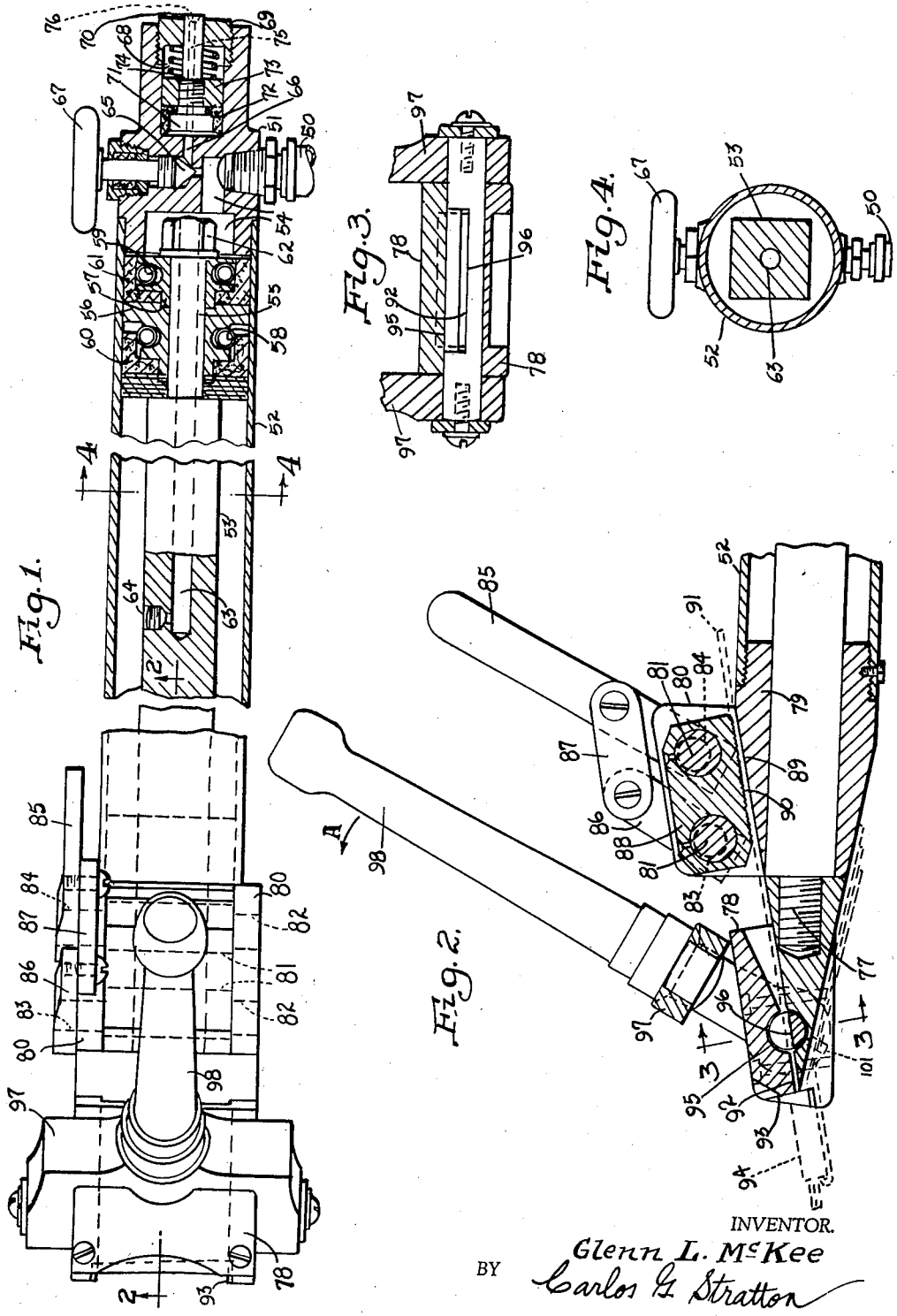
INVENTOR.
Glenn L. McKee
BY Carlos G. Stratton
ATTORNEY.

Patented Nov. 16, 1943

2,334,637

UNITED STATES PATENT OFFICE 2,334,637

BAND TIGHTENING DEVICE

Glenn L. McKee, Bakersfield, Calif., assignor to McKee Bros. Corporation, Bakersfield, Calif.

Application August 7, 1942, Serial No. 453,938

4 Claims. (Cl. 81—9.3)

My invention relates to a banding device adapted for tightening a band around not only circular but also irregularly shaped articles. Important uses of the invention include the tightening of bands around posts, ties, containers, and groups of articles, as well as around hose.

An important object of the invention is to provide means whereby air may be excluded from the hydraulic operating means, whereby the mechanism may be entirely operated by a noncompressible element, to wit, liquid.

Another object of the invention is to provide means for slightly releasing tension on the band without releasing the grip thereon, whereby the tool may be turned to effect an angular bend in the band.

The present tool is adapted for drawing a band through a clip surrounding the band, such as shown in United States Letters Patent No. 2,163,048, issued June 20, 1939, on Band clamp. In drawing the band through a clip, such as shown in my said patent, considerable pressure is exerted on the clip that surrounds the band, and there is danger of distortion of the clip by expansion under such pressure. It is an important object of my present invention to provide means for preventing said distortion.

The invention also comprises novel details of construction and novel combinations and arrangements of parts, which will more fully appear in the course of the following description.

In the drawing, like reference characters designate similar parts in the several views.

Figure 1 is a broken section, partly in plan, of an embodiment of the present invention.

Figure 2 is a section taken on the line 2—2 of Figure 1.

Figure 3 is a section taken on the line 3—3 of Figure 2.

Figure 4 is a section taken on the line 4—4 of Figure 1.

Referring more in details to the drawing, a hose 50 is screwed into a head 51 which is welded in an end of a cylinder 52. Piston rod or ram 53 reciprocates in the cylinder 52.

A flowline 54 connects the hose with the interior of the cylinder 52. A shank 55 on the end of the piston rod 53 carries keepers 56 and 57 which respectively carry endless coil springs 58 and 59. The ends of each coil spring are welded to each other, to provide uniform circumferential tension upon cup leathers 60 and 61, all mounted on the shank 55. A nut 62 clamps said keepers and cup leathers in their said positions. It is understood that the endless springs 58 and 59 are slightly oversize whereby to continually bear against the flanges of the cup leathers, to insure a liquid tight contact with the wall of the cylinder 52.

The piston rod 53 and shank 55 have an alined passage 63, which is closed at the end by plug 64. This passage 63 opens into the flow line 54. In normal operation of the device, the plug 64 continuously closes the passage 63.

At a certain point in the normal operation of the device, it is necessary to slightly reduce the pressure in the line 54. For this purpose a needle valve 65 controls the flow of material from the line 54 to a counter passage 66. A hand wheel 67 controls the needle valve 65.

The passage 66 enlarges, as shown at 68. A plug 69 closes the enlarged passage 68 with the exception of a reciprocating stem 70 disposed on a plunger 71, which is mounted in a cup leather 72. An abutment 73, also on the stem 70 maintains the cup leather 72 in position on the stem. The abutment 73 has a threaded connection with the stem 70, as shown in Figure 1. A coil spring 74 engaging the abutment 73 and the plug 69 tends to move the plunger 71 to the left in Figure 1. The stem 70 is hollow, as indicated at 75, but the hollow portion is normally closed by a screw 76.

The piston rod 53 is square in section and has a threaded connection 77 with a nose 78. Slidable on the piston rod 53 is an end 79 for the cylinder 52 which end constitutes a band clamping head. Upstanding ears 80 on the end 79 provide bearings for eccentric shafts 81. The shafts 81 are eccentric with relation to their journaled ends 82, 83, and 84. The ends 82, 83 and 84 are the portions journaled in the ears 80. The levers 85 and 86 are respectively fastened on projecting ends 84 and 83. A link 87 pivoted on the levers connects them for synchronous operation. Block 88 is bored to receive the eccentric portions 81 of the shafts, whereby rotation of the shafts raises and lowers the block 88 with respect to a face 89 on the end 79. The lower face 90 of the block 88 is milled, whereby to clamp between said face and the face 89, an end 91 of a metal band. The block 88 thus constitutes a band clamping element cooperating with the end or head 79 to form a band clamping member.

The nose 78 is slotted, as shown at 92, to receive the band 91. The forward end of the nose 78 is recessed, as shown at 93, to receive a clip 94 on the band 91 the recess 93 receiving and laterally confining one end of the clip 94 being formed by laterally spaced forward projections of the nose member 78 and being thus open at its top to permit the device, including the nose member and band clamping member, to be elevated for bending the band end 91 vertically relative to the clip.

A transverse bore 95 in the nose 78 carries a rotary shearing bar 96. The shearing bar is a cylindrical member, a longitudinal portion of which is cut away, as best shown in Figure 3, leaving a semi-cylindrical shearing member 96.

A yoke 97 straddles the nose member 78 and is fixedly fastened to the ends of the shearing bar 96, as by a pin 101. A handle 98 on the yoke 97 provides manual means for the operation of the shearing bar 96. In the view shown in Figure 2, the band 91 is free to slide longitudinally in the slot 92 in the nose 78. When the handle 93 is swung in the direction of the arrow A of Figure 2, the shearing is effected by means of the opposed edges of the shearing bar and of the cylindrical bore 95.

In the operation of my device, the first important step is the provision of air-free liquid for the mechanism by excluding air from the portions occupied by the pressure liquid. To remove air from the line 54, the plug 64 is removed after the piston rod 53 has been drawn forwardly until its piston head is against the end 79. In this position the plug 64 is forwardly beyond the clamping head 79 and thus freely accessible for removal. Pressure is then applied to liquid in the hose 50, driving the liquid through the associated parts until the liquid flows out at the opening normally closed by the plug 64. The plug 64 is then replaced and the piston rod 53 shifted to its normal rear position as in Fig. 1. During this step needle valve 65 is closed.

To remove air pockets from the passage 66, the screw 76 is removed and the needle valve 65 opened. Movement of the piston rod 53 will cause liquid to flow through the hollow stem 75. During this flow the screw 76 is replaced thus excluding air pockets from the portion of the liquid that is placed under tension.

In the use of the present device, the band 91 is placed around the article or group of articles desired to be banded. The clip 94 is inserted in the recess 93. During the tightening step, the lever 98 is in the position shown in Figure 2. By rotation of the arm 85, the block 88 clamps the end of the band 91 against the face 89, to hold the band against slippage.

Then to tighten the band, pressure is applied through the hose 50 to the line 54. Pressure in the line 54 drives the head 51 and cylinder 52 to the right, as they are illustrated in Figure 1. In this operation, the cylinder instead of the piston is moved. During the longitudinal movement of the cylinder 52, the clamping block 88 draws the band through the clip 94, thus tightening the band in position.

When the band is tightened a desired amount, the device may be swung upwardly at right angles to the position shown in Figure 2 by releasing the needle valve 65 (which to the present time has remained closed).

Opening the needle valve 65 slightly releases the liquid pressure since the coil spring 74 permits the plunger 71 to recede slightly. This release of pressure is sufficient to permit the swinging movement of the device heretofore mentioned.

After the device has been swung to said right angle position, the band may be sheared by swinging the lever 98 in the direction of the arrow A. Thereafter the severed end of the band may be bent down upon the clip 94.

It is preferred to use oil in the present device although other liquid or mixture of liquids may be used, if desired.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. In a device for tightening a banding means having relatively movable band and clip elements, a member for receiving the clip, having a forward clip receiving recess and a band receiving slot, the slot being narrower than the recess, to receive the band element but exclude the clip element, a second member including clamping means for engaging a band extending through the said slot, and means to move the second member relative to the first member, to move the band clamping means relative to the clip receiving member, the said clip receiving recess being arranged to recess and laterally confine a portion of a clip.

2. In a device for tightening a banding means having relatively movable band and clip elements, a nose member having a relatively narrow slot to receive the band but exclude the clip, and having a forward clip receiving recess wider than the slot located at the front of the slot, to receive and laterally confine the clip to prevent same from spreading and distortion under pressure, clamping means for a band extending through the slot of the head, and means to move the clamping means relative to the nose member, to move the clamped band relative to the clip, the said recess opening upwardly for vertically swinging movement of the nose member and clamping means relative to the clip.

3. In a device for tightening a banding means having relatively movable band and clip elements, a nose member having a relatively narrow slot to receive the band but exclude the clip, laterally spaced forward projections carried by the nose member at the forward end of the slot and spaced from at least one side of the slot, to receive and laterally confine the clip therebetween and prevent the spreading and distortion of the clip under pressure, clamping means for a band extending through the slot of the head, and means to move the clamping means relative to the nose member, to move the band relative to the clip, the said clip receiving projections forming an upwardly opening recess to thus permit vertical swinging movement of the nose member and clamping means relative to the clip.

4. In a device for tightening a banding means having relatively movable band and clip elements, a clamping head having a clamping surface, a clamping member carried thereby and movable toward and away from said surface for clamping a band thereon, a rod slidable axially through said head, a nose member on the forward end of the rod having a band receiving slot the base of which is normally alined with the clamping surface of the head, means carried by the forward portion of the nose member at the front end of its slot and forming a clip receiving and confining recess open at its top to thus permit vertical swinging movement of the nose member and clamping head relative to the clip, and means for causing relative movement of the rod and head to thus shift the latter relative to the nose member.

GLENN L. McKEE.